Patented Oct. 16, 1951

2,571,761

UNITED STATES PATENT OFFICE 2,571,761

METHOD OF REACTING TERTIARY AMINES WITH POLYVINYL ESTERS AND PRODUCTS OBTAINED THEREBY

Delbert D. Reynolds and William O. Kenyon, Rochester, N. Y., assignors to Eastman Kodak Company, Rochester, N. Y., a corporation of New Jersey No Drawing. Application April 14, 1949, Serial No. 87,577

19 Claims. (Cl. 260—79.3)

This invention relates to new polymeric substances and to processes for preparing them. More particularly this invention relates to new polymeric substances obtained by reacting a polyvinyl ester of a sulfonic acid with a tertiary amine.

While the polyvinyl esters of sulfonic acids have been referred to previously in various patents, these esters have not been widely exploited by industry or their properties reported upon in the technical literature. We have now found that these polyvinyl esters of sulfonic acids can be advantageously employed as intermediates in the preparation of other, different polymeric substances which exhibit interesting behavior as dispersing agents, e. g. dispersing agents for silver halides.

The products obtained according to our invention differ in structure and properties from polymers described in the art prior to our invention. For example, polymers of vinylpyridines, wherein the vinyl groups are attached to ring carbon atoms of the pyridine nucleus, have been previously quaternized with esters, such as methyl p-toluenesulfonate, however, a simple quaternization reaction occurs. The product obtained can be represented by the following structure:

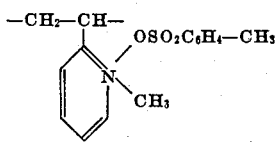

The polyvinyl esters of sulfonic acids of our invention, when reacted with an organic tertiary amine, undergo a much more complex reaction, the details of which are hereinafter described.

Accordingly, it is an object of our invention to provide new polymeric substances useful as dispersing agents. A further object is to provide new water-soluble polymeric substances obtained by the interaction of polyvinyl sulfonic acid esters with tertiary amines. Still another object is to provide methods for obtaining these new polymeric substances. Other objects will become apparent from a consideration of the following description and examples.

These objects are accomplished by reacting a tertiary amine with a polyvinyl ester of a sulfonic acid as described in the following examples.

As polyvinyl esters of sulfonic acids we can advantageously utilize the polyvinyl esters of acids represented by the following general formula:

R—SO₂—OH wherein R represents a member selected from the group consisting of an alkyl group, e. g. methyl, ethyl, n-propyl, isopropyl, n-butyl, isobutyl, etc. groups (e. g. an alkyl group of the formula $C_nH_{2n+1}$ wherein $n$ is a positive integer from 1 to 4) and an aryl group, e. g. phenyl, o-, m- and p-tolyl, α- and β-naphthyl, etc. groups (e. g. an aryl group containing from 6 to 10 carbon atoms). Typical esters include polyvinyl methanesulfonate, polyvinyl ethanesulfonate, polyvinyl n-propanesulfonate, polyvinyl n-butanesulfonate, polyvinyl benzenesulfonate, polyvinyl p-toluenesulfonate, polyvinyl α-naphthalenesulfonate, etc.

Typical tertiary amines useful in practicing our invention include heterocyclic amines, e. g. pyridine, α-, β- and γ-picolines, 2,4-lutidine, 2,5-lutidine, 3,4-lutidine, 2,6-lutidine, α-, β- and γ-collidines, α- and β-parvolines (2,4- and 3,4-diethylpyridines), 2,3,4,5 - tetramethylpyridines, 2 - n - butylpyridine, 3 - n - butylpyridine, 2-sec-butylpyridine, 4-tert.-butylpyridine, 2-ethyl-3,5-dimethylpyridine, 5-isopropyl-2-methylpyridine, 6-isopropyl - 3 - methylpyridine, 2-(β- hydroxyethyl) pyridine, quinoline, isoquinoline, lepidine, N -(β- hydroxyethylmorpholine), etc., tertiary aliphatic amines, e. g. triethyl amine, tri-n-butyl amine, etc., tertiary aromatic amines, N,N-dimethylaniline, N,N-diethylaniline, etc. Organic tertiary amines which have been found to be most useful for the purposes of our invention comprise pyridine and its homologs containing from 5 to 9 carbon atoms in the molecule, e. g. compounds represented by the following general formula:

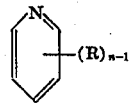

wherein R represents an alkyl group (same or different) of the formula $C_mH_{2m+1}$ wherein $m$ represents a positive integer from 1 to 4, and $n$ represents a positive integer from 1 to 5, and wherein the total number of carbon atoms in the R groups does not exceed four in number.

Temperatures at which our process can most advantageously be carried out vary from about 20° C. to about the temperature of a steam bath (100° C.). Temperatures varying from 40° to 70° C. have been found to be most useful, although some reaction has been observed at temperatures as low as 2° C.

The process of our invention can be carried out in the presence or absence of inert solvents, if desired. Such solvents include alcohols, e. g. methanol, ethanol, n-propanol, etc., 1,4-dioxane, etc. Water can also be added to the reaction mixture, if desired. The tertiary amines themselves are excellently suited to serve as reaction media and can be used according to one embodiment of our invention.

The following examples will serve to illustrate further the manner whereby we practice our invention.

EXAMPLE 1

10 g. of polyvinyl benzenesulfonate containing 15.7% by weight of sulfur, which had been dried over phosphorous pentoxide in a vacuum at room temperature, were dissolved in 100 cc. of anhydrous pyridine. The reaction flask was sealed and placed in a 50° C. water bath. At the end of four days the resinous reaction product began to separate. After seven days the supernatant pyridine was decanted, and the quaternized resin was dissolved in methanol. It was precipitated in 1:1 ethanol:ether mixture, and then leached in ether. The dried product contained 9.9% by weight of sulfur and 4.3% by weight of nitrogen. This product was found to be soluble in water.

EXAMPLE 2

This example was conducted in a manner identical to that of Example 1 except that 3 cc. of water were added to the reaction mixture. The final product obtained from this example contained 10.3% by weight of sulfur and 4.4% by weight of nitrogen. This example illustrates the fact that the presence of water during the reaction has little or no effect on the properties of the products obtained, i. e. no hydrolysis of the sulfonate groups occurs under these conditions.

EXAMPLE 3

10 g. of polyvinyl benzenesulfonate containing 15.7% by weight of sulfur, which had been dried in phosphorous pentoxide in a vacuum at room temperature, were dissolved in 100 cc. of anhydrous pyridine. The reaction vessel was then sealed in a 50° C. water bath. At the end of four days a resinous reaction product had separated. At this point, 50 cc. of methanol were added to the reaction mixture, which formed a homogeneous, viscous mass. The reaction mixture was then held at 50° C. for an additional three days, then filtered, and precipitated in a 1:1 ethanol: ether mixture. It was leached in ether and dried for analysis. It was found to contain 10.6% by weight of sulfur and 4.7% by weight of nitrogen. It was also soluble in water.

EXAMPLE 4

20 g. of polyvinyl benzenesulfonate containing 14.5% by weight of sulfur were dissolved in 100 cc. of anhydrous pyridine, and the mixture placed in a sealed flask at 60° C. At the end of 24 hours a second phase had appeared. A few cc. of water was added to make the reaction mixture homogeneous. After two days a second phase was again separating and water was added once again to make the mixture homogeneous. After a total reaction time of seven days, the homogeneous solution was filtered and precipitated into ethanol. It was then leached in ethanol, dissolved in methanol, filtered and precipitated into a 1:1 ether : ethanol mixture. After leaching the product in ether, it was dried, ground to 20 mesh with Dry Ice (to prevent softening), washed with ether and dried for analysis. A water-soluble product containing 10.0% by weight of sulfur and 4.2% by weight of nitrogen was obtained.

EXAMPLE 5

20 g. of polyvinyl benzenesulfonate containing 14.5% by weight of sulfur were dissolved in 100 cc. of anhydrous α-picoline. The solution was then filtered and heated on a steam bath. At the end of four hours a second phase had begun to separate, whereupon water was added to effect complete solution of the mixture, which was then heated for an additional nine hours. At this point the reaction mixture gave a precipitate when a sample was poured into water, hence it was heated for an additional sixteen hours on the steam bath. The resulting homogeneous solution was filtered and precipitated into ether. It was then dried for analysis. A water-soluble product containing 5.8% by weight of sulfur and 2.4% by weight of nitrogen was obtained.

EXAMPLE 6

10 g. of anhydrous polyvinyl β-naphthalenesulfonate containing 12% by weight of sulfur were dissolved in 100 cc. of anhydrous pyridine. The reaction flask was sealed and placed in a water bath heated to 50° C. At the end of four days a resinous reaction product had begun to separate. After seven days the supernatant liquid was decanted and the resin dissolved in methanol. After filtering it was precipitated in a 1:1 ethanol : ether mixture. After drying it was found to contain 8.6% by weight of sulfur and 3.8% by weight of nitrogen.

EXAMPLE 7

10 g. of anhydrous polyvinyl p-toluenesulfonate containing 15.4% by weight of sulfur were dissolved in 100 cc. of anhydrous pyridine. The reaction vessel was sealed and placed in a water bath heated at 50° C. At the end of seven days the reaction product was in the form of a smooth dope, and it was then filtered and precipitated into acetone. It was redissolved in methanol and again precipitated into acetone. After leaching in ether, it was dried and ground to 20-mesh. On analysis it was found to contain 10.8% by weight of sulfur and 3.3% by weight of nitrogen.

EXAMPLE 8

23 g. of anhydrous polyvinyl methanesulfonate containing 23.3% by weight of sulfur were dissolved in anhydrous pyridine. The reaction flask was sealed and placed in a water bath heated to 50 C. In less than 24 hours a resinous reaction product had separated. After 48 hours the supernatant liquid was decanted and the resin dissolved in water. It was precipitated in ethanol and then dried. It was redissolved in water and again precipitated into an alcoholether mixture. On analysis it was found to contain 16.0% by weight of sulfur and 2.7% by weight of nitrogen.

By replacing the polyvinyl methanesulfonate used in this example with a molecularly equivalent amount of polyvinyl methanesulfonate containing 24.6% by weight of sulfur (a mol ratio of 5.4 polyvinyl methanesulfonate groups for each polyvinyl alcohol group), a water-soluble resin can be obtained.

EXAMPLE 9

20 g. of polyvinyl benzenesulfonate containing 14.5% by weight of sulfur were dissolved in 150 cc. of anhydrous 2,6-lutidine and the mixture heated on a steam bath. After about 15 minutes a second phase had begun to separate. Sufficient water was added to effect solution and the heating was continued. As this second phase continued to separate, water was added at a sufficient rate to keep the solution in a substantially homogeneous state. The total heating time was 18 hours. The resulting smooth dope which was obtained was filtered, precipitated into a 1:1 mixture of ethanol : ether, leached in ether and dried for analysis. It was found to contain 7.5% by weight sulfur and 3.3% by weight of nitrogen.

EXAMPLE 10

40 g. of polyvinyl benzenesulfonate containing 14.5% by weight of sulfur was dissolved in 150 cc. of anhydrous β-picoline and the solution placed in a water bath heated at 60° C. At the end of 48 hours water was added to make the solution homogeneous. After seven days the solution was filtered and precipitated into a 1:1 mixture of ethanol : ether. The product was dissolved in methanol, filtered, and again precipitated into a 1:1 mixture of ethanol : ether. After leaching in ether, the resin was dried for analysis and was found to contain 9.0% by weight of sulfur and 4.0% by weight of nitrogen.

EXAMPLE 11

20 g. of polyvinyl benzenesulfonate containing 14.5% by weight of sulfur were dissolved in 100 cc. of γ-picoline and placed in a water bath heated at 60° C. At the end of 24 hours a second phase had begun to form. A few cc. of water were added to make a homogeneous solution, and at the end of another 24 hours water was again added to effect solution. After seven days, the solution was precipitated into acetone. It was dissolved in methanol, filtered, precipitated into a 1:1 mixture of ethanol : ether and leached in ether. After drying at analysis it was found to contain 9.6% by weight of sulfur and 4.3% by weight of nitrogen. This product was found to be soluble in water.

EXAMPLE 12

Five samples were prepared as follows:

40 g. of polyvinyl benzenesulfonate containing 16.0% by weight of sulfur, 52.2% by weight of carbon and 4.8% by weight of hydrogen (moisture 0.03% by weight) were placed in a flask which had been dried at 110° C., and 250 cc. of pyridine, which had been refluxed and distilled over calcium hydride, were then added. The flasks were stoppered immediately and sealed with paraffin.

A sixth sample was prepared in the same manner and then 10 cc. of water were added. All flasks were then placed in a 50° C. water bath and heated for the times shown in the following table.

The first three samples were worked up as follows:

The samples were precipitated in ethanol, filtered, leached with ethanol, cut into small pieces and then dried. The pieces were then dissolved in an acetone-water solution, filtered and again precipitated in ethanol. After again leaching with ethanol, the products were dried and ground with Dry Ice to 20-mesh particle size. After drying, they were washed with ether and again dried before analysis.

The last three samples were worked up as follows:

The supernatant liquid was decanted and the resins were triturated in three separate portions of ethanol. They were then dissolved in a water : methanol solution and precipitated in substantially anhydrous methanol. After leaching with methanol, the resins were again dissolved in methanol containing a little water, filtered and precipitated in ethanol. The resins were then washed with ether and ground with Dry Ice to 20-mesh particle size. After again washing with ether, the resins were dried for analysis.

Table I

| Sample | Reaction Medium | Time Hours | Per Cent by Weight | | | |
|---|---|---|---|---|---|---|
| | | | S | N | C | H |
| 1 | Anhydrous Pyridine | 10 | 14.8 | 0.8 | 54.0 | 4.9 |
| 2 | do | 24 | 13.3 | 1.7 | 55.1 | 5.2 |
| 3 | do | 48 | 12.7 | 2.4 | 56.3 | 5.0 |
| 4 | do | 96 | 11.2 | 3.3 | 57.4 | 5.4 |
| 5 | do | 192 | 10.7 | 3.9 | 58.9 | 5.6 |
| 6 | Aqueous Pyridine | 192 | 10.7 | 3.0 | 59.1 | 5.6 |

The data in the above table indicates that water has little or no effect on the final result of the reaction and that no apparent hydrolysis of sulfonate groups occurs as a result of its presence. The effect of water is apparently a catalytic one and generally no precautions need be taken to exclude its presence, if the amount involved is not excessive. The diminishing percentages of sulfur in the above table indicate that the polyvinyl ester has reacted to an increasing degree.

The reaction taking place between the polyvinyl ester of the sulfonic acid and the organic tertiary amine follows a course depending somewhat on the composition of the particular polyvinyl ester employed, however, the net result is illustrated by the following equations set forth below. These polyvinyl esters contain varying amounts of polyvinyl alcohol groups which have an interesting effect on the results obtained. The polyvinyl esters utilized in our invention can be obtained by the esterification of polyvinyl alcohol with the appropriate sulfonyl chloride or acid, and the products so obtained contain large amounts of sulfonyl groups with varying amounts of polyvinyl alcohol groups, and sometimes a small number of polyvinyl chloride and polyvinyl acetate groups. Generally, the number of polyvinyl acetate and polyvinyl chloride (formed by reaction of amine hydrochloride, e. g. pyridine hydrochloride, with polyvinyl sulfonate groups) groups are almost negligible and are present in amounts less than one per cent. To illustrate the course of reaction between polyvinyl benzenesulfonate and pyridine, the primary reaction goes according to the equation:

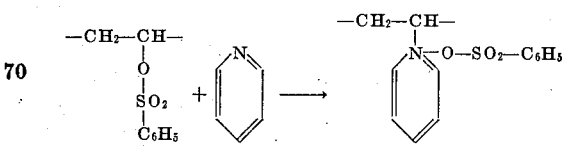

Since the polyvinyl ester also contains alcoholic hydroxyl groups, a second reaction takes place with the liberation of benzenesulfonic acid and the formation of a tetrahydropyran ring:

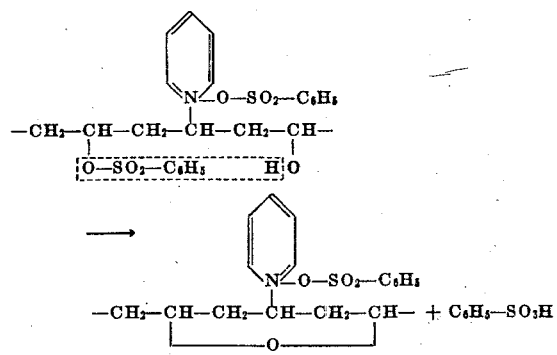

The amount of acid liberated can be measured by titration with a standard caustic solution.

EXAMPLE 13

Six 2 g. samples of polyvinyl benzenesulfonate containing a mole ratio of polyvinyl benzenesulfonate units to polyvinyl alcohol units of 0.732 to 0.268 (corresponds to 16.0% by weight of sulfur) which after drying for three days over phosphorus pentoxide at room temperature contained 0.03 per cent moisture, were placed in ground glass stoppered flasks, which had previously been dried at 100° C. To each of these, anhydrous pyridine was added, the flasks stoppered, sealed with paraffin wax and placed in an oven heated at the temperatures listed in the table. At the intervals of time listed in the table below, the acidity of the samples was determined by adding the liquid listed in the table and titrating with 0.1 N sodium hydroxide.

Table II

| Sample | Cc. Pyridine Reaction Medium | Temp. | Time | Liquid Added Before Titration | Cc. NaOH |
|---|---|---|---|---|---|
| | | ° C. | | | |
| 1 | 75 | 25 | 5 min | 10 cc. H₂O | 1.40 |
| 2 | 25 | 65 | 3 hrs | 10 cc. H₂O+75 cc. pyridine. | 9.90 |
| 3 | 25 | 65 | 7 hrs | 15 cc. H₂O+75 cc. pyridine. | 19.75 |
| 4 | 25 | 65 | 20 hrs | 75 cc. H₂O | 25.30 |
| 5 | 25 | 65 | 44 hrs | 125 cc. H₂O | 28.40 |
| 6 | 25 | 65 | 96 hrs | 150 cc. H₂O | 31.00 |

Five additional 2 g. samples of polyvinyl benzenesulfonate in pyridine were prepared in the same manner described above, except that the reaction medium in each case consisted of 25 cc. of pyridine to which 1 cc. of water had been added. The samples were then worked up and titrated as above.

Table III

| Sample | Temp. | Time | Liquid Added Before Titration | Cc. NaOH |
|---|---|---|---|---|
| | ° C. | Hours | | |
| 1 | 65 | 3 | 10 cc. H₂O+75 cc. pyridine | 12.50 |
| 2 | 65 | 7 | 15 cc. H₂O+75 cc. pyridine | 23.75 |
| 3 | 65 | 20 | 75 cc. H₂O | 31.60 |
| 4 | 65 | 44 | 125 cc. H₂O | 35.00 |
| 5 | 65 | 96 | 150 cc. H₂O | 36.50 |

These tables indicate that at elevated temperatures water has some slight catalytic effect on the formation of the tetrahydropyran ring. This effect diminishes at lower temperatures. This tendency toward ring formation in the presence of water is not due to any hydrolysis as has been demonstrated above.

The polyvinyl esters of sulfonic acids used in our invention can be prepared by reacting polyvinyl alcohol or substantially completely hydrolyzed polyvinyl acetate with a sulfonyl chloride or sulfonic acid. The following examples illustrate methods whereby such esters can be prepared.

EXAMPLE 14

54 g. of polyvinyl alcohol were swollen by heating on a steam bath in 500 cc. of 90:10 pyridine-water mixture for six hours. The supernatant liquid was decanted and one liter of benzene and one liter of pyridine were added, and the benzene distilled off to remove most of the moisture. Two liters of anhydrous pyridine were then added, and the mixture was transferred to a dried reaction vessel. The mixture was cooled to 10° C. and 400 g. of p-toluenesulfonyl chloride were added. The mixture was stirred for 50 hours at 5° to 10° C. After precipitating the viscous reaction mixture into water, it was leached with water, dried and then dissolved in acetone. It was again precipitated into water and then dried. After redissolving in acetone, the precipitated product was filtered, precipitated into ethanol and then dried for analysis. It contained 15.4% by weight of sulfur, which represents a mol ratio of 4.64 polyvinyl p-toluenesulfonate groups for each polyvinyl alcohol group.

EXAMPLE 15

11 g. of polyvinyl alcohol were swollen and the excess moisture removed exactly as described in the preceding example. The resulting swollen polyvinyl alcohol in 500 cc. of pyridine was transferred to a dried reaction vessel and cooled to 10° C. and 70 g. of β-naphthalenesulfonyl chloride were then added, and the reaction mixture was stirred for 44 hours at 5° to 10° C. The resulting viscous solution was slowly poured into distilled water, and the precipitated resin washed, dried, dissolved in pyridine and filtered. After reprecipitation in water, it was dried. The resin was dissolved in pyridine a second time, reprecipitated into ethanol and dried for analysis. It was found to contain 12.0% by weight of sulfur, which represents a mol ratio of 1.3 polyvinyl naphthalenesulfonate groups to each polyvinyl alcohol group.

EXAMPLE 16

44 g. of polyvinyl alcohol were dissolved with stirring in 500 cc. of distilled water, which was heated on a steam bath. The resulting solution was filtered and slowly poured into pyridine. The fibrous precipitate was extracted with pyridine for four hours in a Soxhlet extractor and then reacted with 200 g. of methanesulfonyl chloride at 0° to 10° C. for seven hours. The reaction mixture was poured into ice water, and the polyvinyl methanesulfonate which separated was leached in water and then air-dried. After redissolving the dried polymer in moist acetone, it was filtered, precipitated into water, leached and dried. On analysis, it was found to contain 23.3% by weight of sulfur.

In a manner similar to that described in the above example, a polyvinyl methanesulfonate resin was prepared which was found to contain 24.6% by weight of sulfur. This corresponds to a mol ratio of 5.4 polyvinyl sulfonate groups for each polyvinyl alcohol group.

EXAMPLE 17

88 g. of polyvinyl alcohol containing 5% moisture were swollen by heating with 500 cc. of pyridine for two days on a steam bath. Two liters of anhydrous pyridine were added and the resulting mixture transferred to a reaction vessel which had been completely dried. The mixture was cooled to 5° C. and 500 cc. of benzenesulfonyl chloride were added over a period of half an hour. After stirring for 25 hours at 3° to 5° C., the resulting viscous, homogeneous solution was precipitated in distilled water. The white, fibrous polymer so obtained was then leached with distilled water, centrifuged, and air-dried. It was then dissolved in acetone, filtered, and precipitated into distilled water. After again leaching in distilled water, it was dried for analysis. It was found to contain 15.7% by weight of sulfur.

In a manner similar to that described in the above examples, other polyvinyl esters of alkyl or aryl sulfonic acids can be prepared. For example, polyvinyl esters of benzenesulfonic acid containing 14.5% by weight of sulfur, or 16.0% by weight of sulfur can be prepared by varying the time of reaction or the temperature at which the reaction is carried out.

The polyvinyl esters which have been found most useful for the purposes of our invention generally contain a mol ratio of from 1 to 6 polyvinyl ester groups for each polyvinyl alcohol group present in the starting resin. Other polyvinyl esters which are useful in practicing the process of our invention can advantageously be prepared by the methods described in our copending application Serial No. 87,575, filed on even date herewith, now U. S. Patent 2,531,468, issued November 28, 1950. The process of our invention should be carried out utilizing polyvinyl esters which are substantially free from halogen groups, e. g., polyvinyl chloride groups, which cause undesirable side reactions and limit the utility of the resulting products. Hydrogen halides should also be absent during our process, since they react with the amines to form salts, which in turn react with the sulfonate groups to produce undesirable polyvinyl halide groups in the reaction products. The polyvinyl esters of the sulfonic acids should, therefore, be purified as described above before being used.

What we claim as our invention and desire secured by Letters Patent of the United States is:

1. A process for preparing a sulfonated resin comprising heating in the substantial absence of a hydrogen halide a polyvinyl ester containing groups represented by the formula:

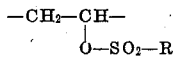

wherein R represents a member selected from the group consisting of an alkyl group of the formula $C_nH_{2n+1}$ wherein $n$ represents a positive integer of from 1 to 4 and an aryl group containing 6 to 10 carbon atoms, and groups represented by the formula:

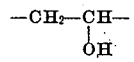

said groups being present in a mol ratio of from 1 to 6 polyvinyl ester groups to each polyvinyl alcohol group, with a tertiary amine of the pyridine series.

2. A process for preparing a sulfonated resin comprising heating in the substantial absence of a hydrogen halide a polyvinyl ester containing groups represented by the formula:

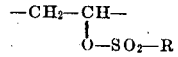

wherein R represents an alkyl group of the formula $C_nH_{2n+1}$ wherein $n$ represents a positive integer from 1 to 4, and groups represented by the formula:

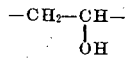

said groups being present in a mol ratio of from 1 to 6 polyvinyl ester groups to each polyvinyl alcohol group, with a tertiary amine of the pyridine series.

3. A process for preparing a sulfonated resin comprising heating in the substantial absence of a hydrogen halide at a temperature of from 20° to 100° C. a polyvinyl ester containing groups represented by the formula:

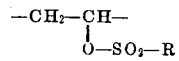

wherein R represents an alkyl group of the formula $C_nH_{2n+1}$ wherein $n$ represents a positive integer from 1 to 4, and groups represented by the formula:

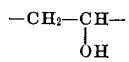

said groups being present in a mol ratio of from 1 to 6 polyvinyl ester groups to each polyvinyl alcohol group, with a tertiary amine of the pyridine series.

4. A process for preparing a sulfonated resin comprising heating in the substantial absence of a hydrogen halide at a temperature of from 40° to 70° C. a polyvinyl ester containing groups represented by the formula:

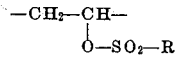

wherein R represents an alkyl group of the formula $C_nH_{2n+1}$ wherein $n$ represents a positive integer from 1 to 4, and groups represented by the formula:

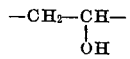

said groups being present in a mol ratio of from 1 to 6 polyvinyl ester groups to each polyvinyl alcohol group, with a tertiary amine of the pyridine series.

5. A process for preparing a sulfonated resin comprising heating in the substantial absence of a hydrogen halide at a temperature of from 20° to 100° C. a polyvinyl ester containing groups represented by the formula:

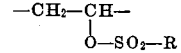

wherein R represents an alkyl group of the formula $C_nH_{2n+1}$ wherein $n$ represents a positive integer from 1 to 4, and groups represented by the formula:

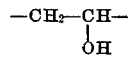

said groups being present in a mol ratio of from 1 to 6 polyvinyl ester groups to each polyvinyl alcohol group, with pyridine.

6. A process for preparing a sulfonated resin comprising heating in the substantial absence of a hydrogen halide a polyvinyl ester containing groups represented by the formula:

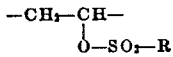

wherein R represents an aryl group containing 6 to 10 carbon atoms, and groups represented by the formula:

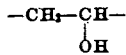

said groups being present in a mol ratio of from 1 to 6 polyvinyl ester groups to each polyvinyl alcohol group, with a tertiary amine of the pyridine series.

7. A process for preparing a sulfonated resin comprising heating in the substantial absence of a hydrogen halide at a temperature of from 20° to 100° C. a polyvinyl ester containing groups represented by the formula:

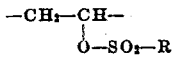

wherein R represents an aryl group containing 6 to 10 carbon atoms, and groups represented by the formula:

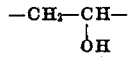

said groups being present in a mol ratio of from 1 to 6 polyvinyl ester groups to each polyvinyl alcohol group, with a tertiary amine of the pyridine series.

8. A process for preparing a sulfonated resin comprising heating in the substantial absence of a hydrogen halide at a temperature of from 20° C. to 100° C. a polyvinyl compound containing polyvinyl methanesulfonate groups represented by the formula:

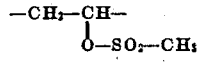

and polyvinyl alcohol groups, said groups being present in a mol ratio of 1 to 6 polyvinyl methanesulfonate groups to each polyvinyl alcohol group, with a tertiary amine of the pyridine series.

9. A process for preparing a sulfonated resin comprising heating in the substantial absence of a hydrogen halide at a temperature of from 20° C. to 100° C. a polyvinyl compound containing polyvinyl methanesulfonate groups represented by the formula:

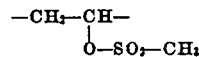

and polyvinyl alcohol groups, said groups being present in a mol ratio of 1 to 6 polyvinyl methanesulfonate groups to each polyvinyl alcohol group, with pyridine.

10. A process for preparing a sulfonated resin comprising heating in the substantial absence of a hydrogen halide at a temperature of from 20° C. to 100° C. a polyvinyl compound containing polyvinyl benzenesulfonate groups represented by the formula:

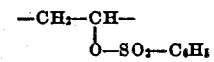

and polyvinyl alcohol groups, said groups being present in a mol ratio of 1 to 6 polyvinyl benzenesulfonate groups to each polyvinyl alcohol group, with a tertiary amine of the pyridine series.

11. A process for preparing a sulfonated resin comprising heating in the substantial absence of a hydrogen halide at a temperature of from 20° C. to 100° C. a polyvinyl compound containing polyvinyl benzene sulfonate groups represented by the formula:

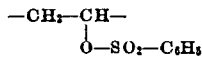

and polyvinyl alcohol groups, said groups being present in a mol ratio of 1 to 6 polyvinyl benzenesulfonate groups to each polyvinyl alcohol group, with pyridine.

12. The products obtained by the process of claim 1.

13. The products obtained by the process of claim 2.

14. The products obtained by the process of claim 6.

15. The products obtained by the process of claim 9.

16. The products obtained by the process of claim 11.

17. A process for preparing a sulfonated resin comprising heating in the substantial absence of a hydrogen halide at a temperature of from 20° C. to 100° C., a polyvinyl compound containing polyvinyl p-toluenesulfonate groups represented by the formula:

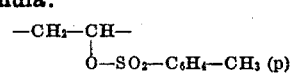

and polyvinyl alcohol groups, said groups being present in a mol ratio of 1:6 polyvinyl p-toluenesulfonate groups to each polyvinyl alcohol group, with a tertiary amine of the pyridine series.

18. A process for preparing a sulfonated resin comprising heating in the substantial absence of a hydrogen halide at a temperature of from 20° C. to 100° C., a polyvinyl compound containing polyvinyl p-toluenesulfonate groups represented by the formula:

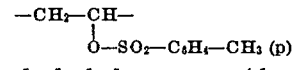

and polyvinyl alcohol groups, said groups being present in a mol ratio of 1:6 polyvinyl p-toluenesulfonate groups to each polyvinyl alcohol group, with pyridine.

19. The products obtained by the process of claim 18.

DELBERT D. REYNOLDS.
WILLIAM O. KENYON.

REFERENCES CITED

The following references are of record in the file of this patent:

UNITED STATES PATENTS

| Number | Name | Date |
|---|---|---|
| 2,395,347 | Sharkey | Feb. 19, 1946 |

OTHER REFERENCES

Izard: Industrial and Engineering Chemistry, vol. 41, pages 617–621, March 1949.